US012448844B2

(12) United States Patent
Major et al.

(10) Patent No.: US 12,448,844 B2
(45) Date of Patent: Oct. 21, 2025

(54) LADDERS, MECHANISMS AND COMPONENTS FOR LADDERS, AND RELATED METHODS

(71) Applicant: LITTLE GIANT LADDER SYSTEMS, LLC, Springville, UT (US)

(72) Inventors: Aaron Bruce Major, Nephi, UT (US); Bradley Scott Maxfield, Spanish Fork, UT (US); Gary M. Jonas, Springville, UT (US); Brian B. Russell, Saratoga Springs, UT (US); N. Ryan Moss, Mapleton, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 532 days.

(21) Appl. No.: 17/826,830

(22) Filed: May 27, 2022

(65) Prior Publication Data

US 2022/0298861 A1 Sep. 22, 2022

Related U.S. Application Data

(63) Continuation of application No. 16/820,286, filed on Mar. 16, 2020, now Pat. No. 11,346,154, which is a (Continued)

(51) Int. Cl.
*E06C 7/42* (2006.01)
*E06C 1/12* (2006.01)
(Continued)

(52) U.S. Cl.
CPC ................ *E06C 7/423* (2013.01); *E06C 1/12* (2013.01); *E06C 7/44* (2013.01); *E06C 7/46* (2013.01)

(58) Field of Classification Search
CPC ..... E06C 1/00; E06C 1/02; E06C 1/08; E06C 1/12; E06C 7/00; E06C 7/42; E06C 7/44; E06C 7/46; E06C 7/423
See application file for complete search history.

(56) References Cited

U.S. PATENT DOCUMENTS 1,193,043 A 8/1916 Merrin
1,379,808 A 5/1921 Fies
(Continued)

FOREIGN PATENT DOCUMENTS

KR 200146389 Y1 6/1999

OTHER PUBLICATIONS

International Preliminary Report on Patentability dated Apr. 9, 2019 for International Patent Application No. PCT/US2017/055126.
(Continued)

*Primary Examiner* — Daniel P Cahn
*Assistant Examiner* — Shiref M Mekhaeil
(74) *Attorney, Agent, or Firm* — Dorsey & Whitney LLP

(57) ABSTRACT

Ladders and ladder components are provided including feet for ladders configured for securement of the ladder to a supporting surface, adjustable leg members for ladders, bearing members for ladders, and adjustment mechanisms for ladders. In one embodiment, an adjustment mechanism may include a first pair of spaced apart rails, a pair of adjustable legs having a first end hingedly coupled to one of a pair of adjustment mechanisms and a second end coupled with a foot. The adjustment mechanisms may be slidably coupled with the rails and in one embodiment, each adjustment mechanism is selectively displaceable along a length of its associated rail only when upward force is absent from the adjustment mechanism, the upward force being defined in a direction from a lower end of the associated rail towards the adjustment mechanism.

18 Claims, 15 Drawing Sheets

Related U.S. Application Data continuation of application No. 15/724,547, filed on Oct. 4, 2017, now Pat. No. 10,590,702.

(60) Provisional application No. 62/404,672, filed on Oct. 5, 2016.

(51) Int. Cl.
*E06C 7/44* (2006.01)
*E06C 7/46* (2006.01)

(56) References Cited

U.S. PATENT DOCUMENTS

| | | | | | |
|---|---|---|---|---|---|
| 1,425,072 | A | | 8/1922 | Adams | |
| 1,536,434 | A | | 5/1925 | Hearn | |
| 1,609,257 | A | | 11/1926 | Lazear | |
| 1,705,000 | A | | 3/1929 | Gustav | |
| 1,729,033 | A | | 9/1929 | Fred | |
| 1,733,338 | A | | 10/1929 | Enke | |
| 1,879,017 | A | | 9/1932 | Babitt | |
| 1,973,226 | A | | 9/1934 | Rose et al. | |
| 2,767,898 | A | | 10/1956 | Cramer | |
| 3,321,042 | A | * | 5/1967 | Kocina | E06C 1/12 182/209 |
| 3,331,468 | A | * | 7/1967 | Redman | E06C 1/12 182/209 |
| 3,343,630 | A | * | 9/1967 | Redman | E06C 1/12 182/209 |
| 3,415,475 | A | | 12/1968 | Goodman | |
| 3,428,147 | A | | 2/1969 | Gordon | |
| 3,491,853 | A | * | 1/1970 | Stillman, Jr. | E06C 1/12 182/46 |
| 3,502,173 | A | * | 3/1970 | Arnold | E06C 7/083 182/228.2 |
| 3,935,926 | A | * | 2/1976 | Butler | E06C 1/12 182/208 |
| 3,948,352 | A | * | 4/1976 | Larson | E06C 7/44 182/207 |
| 3,948,353 | A | * | 4/1976 | Lane | E06C 7/48 182/206 |
| 4,147,231 | A | | 4/1979 | Chantler et al. | |
| 4,155,422 | A | * | 5/1979 | Larson | E06C 1/22 182/124 |
| 4,200,254 | A | | 4/1980 | Nelson | |
| 4,371,055 | A | | 2/1983 | Ashton et al. | |
| 4,415,062 | A | | 11/1983 | Shaw | |
| 4,485,602 | A | | 12/1984 | Flamboe et al. | |
| 4,519,477 | A | | 5/1985 | Ralston | |
| 4,632,220 | A | | 12/1986 | Murrell | |
| 4,662,227 | A | | 5/1987 | Peterson | |
| 4,694,932 | A | | 9/1987 | Schmitt | |
| 4,723,629 | A | | 2/1988 | Vanden et al. | |
| 5,034,868 | A | | 7/1991 | Stelfox et al. | |
| 5,086,876 | A | | 2/1992 | Severson | |
| 5,141,076 | A | | 8/1992 | Joyce et al. | |
| 5,305,851 | A | | 4/1994 | Katson et al. | |
| 5,370,203 | A | | 12/1994 | Kiska | |
| 5,427,342 | A | | 6/1995 | Gagnon | |
| 5,497,850 | A | | 3/1996 | Patterson | |
| 5,526,898 | A | | 6/1996 | Clark | |
| 5,595,410 | A | | 1/1997 | Wilson et al. | |
| 5,669,462 | A | | 9/1997 | Jennings | |
| 5,704,451 | A | | 1/1998 | King | |
| 5,758,745 | A | * | 6/1998 | Beggs | E06C 1/12 182/213 |
| D399,210 | S | | 10/1998 | Rozier et al. | |
| 5,954,075 | A | | 9/1999 | Gilmour | |
| 6,073,726 | A | | 6/2000 | Mccrystal | |
| 6,145,618 | A | | 11/2000 | Verenski | |
| 6,189,654 | B1 | | 2/2001 | Bailey | |
| 6,450,292 | B1 | | 9/2002 | Sheffield | |
| 6,547,036 | B1 | | 4/2003 | Carter | |
| D475,995 | S | | 6/2003 | Hsieh | |
| 6,595,326 | B1 | | 7/2003 | Dean | |
| 6,981,680 | B1 | | 1/2006 | Gordon et al. | |
| 7,000,731 | B2 | | 2/2006 | Swiderski et al. | |
| 7,172,216 | B1 | | 2/2007 | Lagsdin | |
| 7,216,742 | B2 | | 5/2007 | Spengler | |
| 7,837,010 | B2 | | 11/2010 | Astor | |
| D634,737 | S | | 3/2011 | Lippert et al. | |
| 8,215,452 | B2 | | 7/2012 | Stewart et al. | |
| 8,365,865 | B2 | | 2/2013 | Moss et al. | |
| 8,407,855 | B2 | | 4/2013 | Gagnon | |
| 8,408,408 | B1 | | 4/2013 | Dumm | |
| 8,505,861 | B2 | | 8/2013 | Carnevali | |
| 8,807,277 | B1 | | 8/2014 | Reyna Lerma et al. | |
| 9,010,491 | B2 | | 4/2015 | Trang | |
| 9,145,733 | B2 | | 9/2015 | Worthington et al. | |
| 9,260,910 | B1 | | 2/2016 | Flannery et al. | |
| 9,797,194 | B2 | | 10/2017 | Moss et al. | |
| 9,834,989 | B2 | | 12/2017 | Lanzafame | |
| 9,896,163 | B2 | | 2/2018 | Lewis | |
| 10,047,561 | B1 | | 8/2018 | Lanzafame | |
| 10,107,035 | B1 | | 10/2018 | Lanzafame | |
| 10,138,682 | B2 | | 11/2018 | Mora et al. | |
| 10,322,704 | B2 | | 6/2019 | Nobles et al. | |
| 10,590,702 | B2 | | 3/2020 | Major et al. | |
| 10,738,531 | B2 | | 8/2020 | Ballard et al. | |
| 11,834,908 | B2 | * | 12/2023 | Garcia | E06C 1/12 |
| 2003/0230455 | A1 | | 12/2003 | Armstrong | |
| 2004/0020582 | A1 | | 2/2004 | Swiderski et al. | |
| 2004/0129497 | A1 | | 7/2004 | Weiss | |
| 2005/0056741 | A1 | | 3/2005 | Higgs et al. | |
| 2006/0076192 | A1 | | 4/2006 | Jackson | |
| 2007/0163839 | A1 | | 7/2007 | Dangrow et al. | |
| 2008/0314682 | A1 | | 12/2008 | Cogswell et al. | |
| 2010/0038172 | A1 | | 2/2010 | Ralston | |
| 2010/0116592 | A1 | | 5/2010 | Clements et al. | |
| 2010/0300805 | A1 | | 12/2010 | Moss et al. | |
| 2011/0127110 | A1 | | 6/2011 | Trang | |
| 2014/0110189 | A1 | | 4/2014 | Dangrow et al. | |
| 2014/0202793 | A1 | | 7/2014 | Jonas et al. | |
| 2015/0041744 | A1 | | 2/2015 | Higgs | |
| 2015/0068842 | A1 | | 3/2015 | Moss et al. | |
| 2015/0267468 | A1 | | 9/2015 | Moss et al. | |
| 2016/0123079 | A1 | * | 5/2016 | Ballard | E06C 7/46 182/207 |
| 2017/0009528 | A1 | | 1/2017 | Pascut | |
| 2017/0254145 | A1 | | 9/2017 | Ballard et al. | |
| 2018/0094403 | A1 | | 4/2018 | Nobles et al. | |
| 2018/0094488 | A1 | | 4/2018 | Major et al. | |
| 2018/0238111 | A1 | | 8/2018 | Walsh | |
| 2020/0040656 | A1 | | 2/2020 | Mora et al. | |
| 2020/0325727 | A1 | | 10/2020 | Reyes Acosta | |

OTHER PUBLICATIONS

PCT International Search Report for International Application No. PCT/US2017/055126, mailed Mar. 5, 2018 (4 pp).

* cited by examiner

LADDERS, MECHANISMS AND COMPONENTS FOR LADDERS, AND RELATED METHODS

CROSS-REFERENCE TO RELATED APPLICATIONS

This application is a continuation of U.S. patent application Ser. No. 16/820,286, filed on 16 Mar. 2020, now pending, which is a continuation of U.S. patent application Ser. No. 15/724,547 filed on 4 Oct. 2017, now U.S. Pat. No. 10,590,702, which application claims the benefit of U.S. Provisional Patent Application No. 62/404,672 filed on 5 Oct. 2016, the disclosures of which are incorporated by reference herein in their entireties.

BACKGROUND

Ladders are conventionally utilized to provide a user thereof with improved access to elevated locations that might otherwise be inaccessible. Ladders come in many shapes and sizes, such as straight ladders, extension ladders, stepladders, and combination step and extension ladders (sometimes referred to as articulating ladders). So-called combination ladders may incorporate, in a single ladder, many of the benefits of multiple ladder designs.

Ladders known as straight ladders or extension ladders include ladders that are not conventionally self-supporting but, rather, are positioned against an elevated surface, such as a wall or the edge of a roof, to support the ladder at a desired angle. A user then ascends the ladder to obtain access to an elevated area, such as access to an upper area of the wall or access to a ceiling or roof. A pair of feet or pads, each being coupled to the bottom of an associated rail of the ladder, are conventionally used to engage the ground or some other supporting surface.

Extension ladders provide a great tool to access elevated areas while also being relatively compact for purposes of storage and transportation. However, extension ladders are often relatively heavy, making them difficult to maneuver. The weight or bulk that is traditionally associated with extension ladders can be attributed, at least in part, to the need for rigidity in the ladder when it is fully extended. When the ladder is extended, it needs to be able to withstand bending and twisting tendencies when subjected to the weight of a user.

Additionally, the stability of a ladder is of paramount consideration, particularly when it is understood that the ladder may be used in a variety of conditions such as on surfaces that may be slippery or that are uneven.

There is a continuing desire in the industry to provide improved functionality of ladders while also improving the safety and stability of such ladders.

SUMMARY OF THE DISCLOSURE

Various embodiments of ladders, ladder mechanisms and ladder components are provided herein. Additionally, methods of using and manufacturing ladders are provided. In accordance with one embodiment, a ladder is provided that comprises a first assembly having a first pair of spaced apart rails and a first plurality of rungs extending between, and coupled to, the pair of first pair of spaced apart rails, a second assembly having a second pair of spaced apart rails and a second plurality of rungs extending between, and coupled to, the pair of second pair of spaced apart rails, the first assembly being slidably coupled with the second assembly, and at least one bearing member coupled to a first rail of first pair of rails, the bearing member having a body portion disposed within a recess of the first rail and an elongated L-slot formed within the body portion, the elongated L-slot matingly and slidingly engaging a first rail of the second pair of rails.

In one embodiment, the elongated L-slot includes a lateral shoulder portion having a bearing surface.

In one embodiment, the bearing surface of the lateral shoulder portion is angled relative to a lateral axis extending through each of the first pair of rails substantially parallel to a longitudinal extension of a rung of the first plurality of rungs.

In one embodiment, the bearing surface of the lateral shoulder portion is arcuate.

In one embodiment, the bearing surface of the lateral shoulder portion exhibits a radius about an axis substantially perpendicular to the lateral axis, the radius being of approximately 100 inches.

In one embodiment, the bearing surface of the lateral shoulder portion exhibits length of approximately 3.5 to approximately 4 inches.

In one embodiment, the first assembly is configured as a base section and the second assembly is configured as a fly section.

In one embodiment, the ladder further comprises a pair of feet, each foot of the pair of feet being coupled to an associated rail of the first pair of spaced apart rails and including a body portion and an open-faced slot formed in a peripheral edge of the body portion.

In accordance with another embodiment of the disclosure, a ladder is provided that comprises a first pair of spaced apart rails, a plurality of rungs extending between and coupled to the first pair of spaced apart rails, a pair of adjustable legs, wherein each adjustable leg has a first end hingedly coupled to one of a pair of adjustment mechanisms and a second end coupled with a foot, each adjustment mechanism of the pair being slidably coupled with a rail of the pair of spaced apart rails, a pair of swing arms, each swing arm being pivotally coupled with a rail of the pair of spaced apart rails and also being pivotally coupled with an associated leg, wherein each adjustment mechanism is selectively displaceable along a length of its associated rail only when upward force is absent from the adjustment mechanism, the upward force being defined in a direction from a lower end of the associated rail towards the adjustment mechanism.

In one embodiment, the ladder further comprises a pair of lock plates, each lock plate fixed with a rail of the first pair of rails and having at least one column of openings, each adjustment mechanism being slidably coupled with an associated lock plate of the pair of lock plates.

In one embodiment, the at least one column of openings includes two columns of staggered openings.

In one embodiment, the adjustment mechanism includes a lock pin for releasable and selective engagement with one or more of a plurality of openings of the at least one column of openings.

In one embodiment, the lock pin includes a laterally extending protrusion with an upward extending lip on an end of the protrusion.

In one embodiment, the lock pin is biased towards engagement with an aligned opening of the at least one column of openings.

In one embodiment, each adjustment mechanism includes an upper surface configured for engagement by the palm of a user and a slidable release handle configured for engagement by the fingers of a user so that a user may displace the release lever relative to the upper surface through a squeezing action.

In one embodiment, the release handle includes a recess and a shoulder portion above the recess.

In one embodiment, the ladder further comprises a pair of feet, each foot of the pair of feet being coupled to an associated rail of the first pair of spaced apart rails and including a body portion and an open-faced slot formed in a peripheral edge of the body portion.

In another embodiment of the disclosure, a ladder is provided that comprises a first assembly having a pair of spaced apart rails and a plurality of rungs extending between, and coupled to, the pair of spaced apart rails, and a pair of feet, each foot of the pair of feet being coupled to an associated rail of the first pair of spaced apart rails and including a body portion and an open-faced slot formed in a peripheral edge of the body portion.

In one embodiment, the body portion of each foot includes a plate member, and wherein the each foot includes an engagement pad coupled with a lower surface of the plate member, wherein the open-face slot is formed in the plate member and the engagement pad.

In one embodiment, the open-faced slot is defined, at least in part, by a pair of spaced-apart, protruding fingers that extend outwardly from the body portion and curve downwardly.

In accordance with one embodiment of the disclosure, a method of utilizing a ladder is provided, the method comprising disposing a securing member in a supporting surface, and arranging a foot of a ladder and the securing member such that the securing member is located within an open-face slot of the foot.

In one embodiment, disposing the securing member in a supporting surface includes disposing the securing member directly through the open-faced slot after the ladder has been placed in a desired location relative to the supporting surface.

In one embodiment, the method further comprises removing the ladder from the supporting surface while leaving securing member in place.

In accordance with another embodiment of the disclosure, a ladder is provided that comprises a first assembly including a pair of spaced apart rails and a plurality of rungs extending between and coupled to the pair of spaced apart rails, a pair of adjustable legs, each adjustable leg having a first end slidably coupled with one of the pair of spaced apart rails, a pair of swing arms, each swing arm having a first end pivotally coupled to an associated bracket of the pair of brackets and a second end pivotally coupled with an associated adjustable leg of the pair of adjustable legs, wherein each adjustable leg is configured to be displaced relative to its associated rail from a first position, wherein the adjustable leg extends at an angle relative to its associated rail, to a second position wherein the adjustable leg is adjacent to and extends substantially parallel to its associated rail, and wherein, when each adjustable leg is in its second position, a substantial portion of the associated swing arm is positioned within a recess formed within the adjustable leg and substantially concealed thereby.

In one embodiment, when each adjustable leg is in its second position, at least a substantial of its associated swing arm extends parallel to the associated rail.

In one embodiment, the ladder further comprises a pair of feet, wherein each foot of the pair of feet is coupled to a second end of an associated adjustable leg of the pair of adjustable legs.

In one embodiment, when each adjustable leg is in its second position, its associated foot is located at a position that is lower than a lowermost end of its associated rail when the ladder is in an orientation for intended use.

In one embodiment, a distance between the first end of each adjustable leg and its associated foot is a fixed distance.

In one embodiment, each swing arm of the pair of swing arms is fixed in length as it extends between its associated bracket and its associated adjustable leg.

In one embodiment, the ladder further comprises a first pair of brackets, each bracket being coupled to an associated rail of the pair of spaced apart rails, each bracket being pivotally coupled with an associated swing arm of the pair of swing arms, wherein, when each adjustable leg is in its second position, a substantial portion of the bracket is positioned within a recess formed within the associated adjustable leg and substantially concealed thereby.

In one embodiment, the ladder further comprises a first pair of brackets, each bracket being coupled to an associated leg of the pair of adjustable legs, each bracket being pivotally coupled with an associated swing arm of the pair of swing arms, wherein, when each adjustable leg is in its second position, a substantial portion of the bracket is positioned within a recess formed within the associated adjustable leg and substantially concealed thereby.

Any feature, component or aspect of a given embodiment described herein may be combined with any other feature, component or aspect of another embodiment described herein without limitation.

BRIEF DESCRIPTION OF THE DRAWINGS

The foregoing and other advantages of various embodiments of the disclosure will become apparent upon reading the following detailed description and upon reference to the drawings in which.

DETAILED DESCRIPTION

Figure 1:
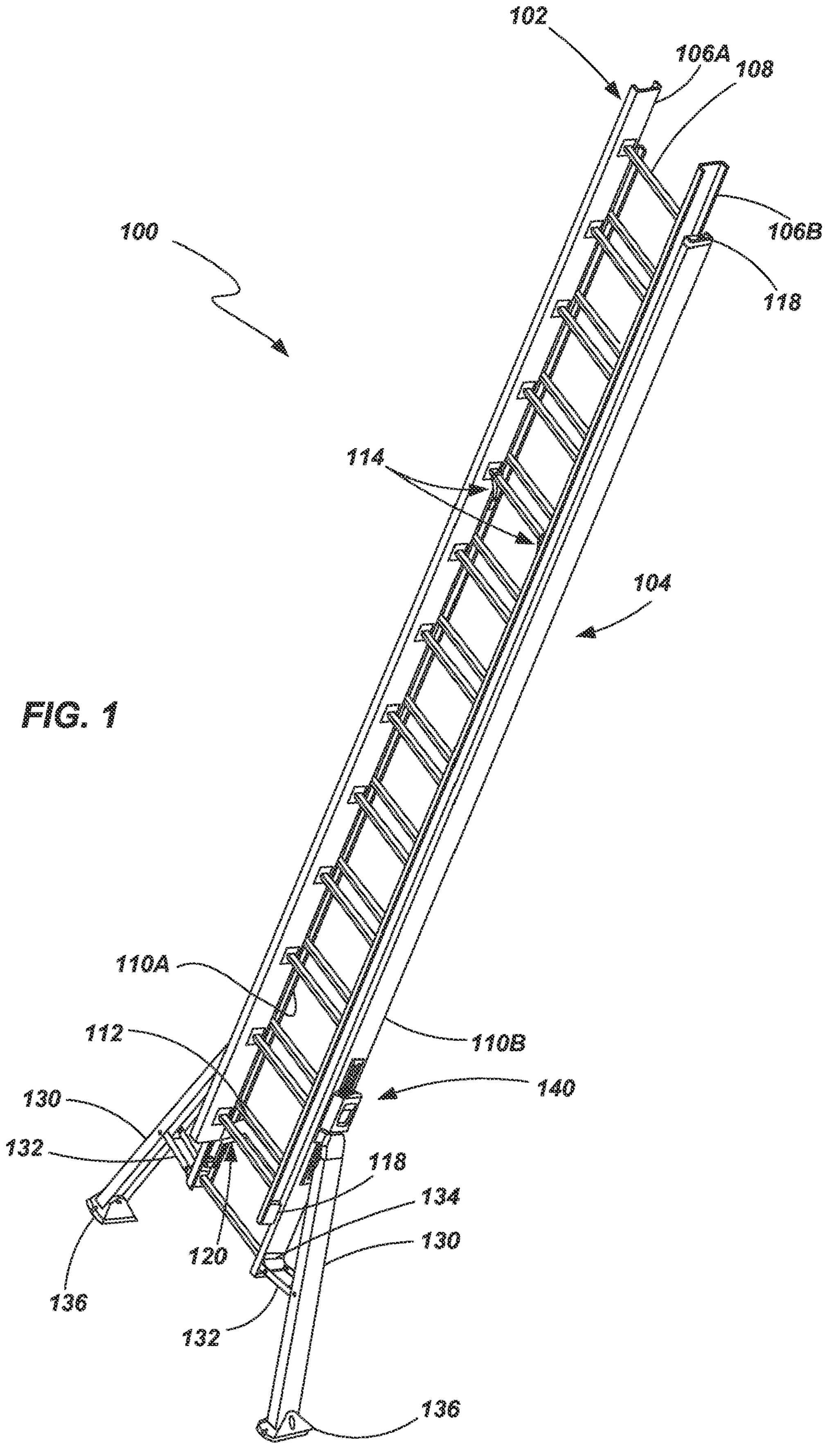
FIG. 1 is a perspective view of an extension ladder according to an embodiment of the present disclosure.

Referring to FIG. 1, a ladder 100 is shown according to an embodiment of the present disclosure. The ladder 100 is configured as an extension ladder and includes a first assembly, which may be referred to as a fly section 102, and a second assembly, which may be referred to as a base section 104. The fly section 102 is slidably coupled with the base section 104 so as to enable adjustment of the ladder 100 to various lengths (or, rather, heights). The fly section 102 includes a pair of spaced apart rails 106A and 106B (generally referenced as 106 herein for purposes of convenience) with a plurality of rungs 108 extending between, and coupled to, the rails 106. Similarly, the base section 104 includes a pair of spaced apart rails 110A and 110B (generally referenced herein as 110 for purposes of convenience) with a plurality of rungs 112 extending between, and coupled to, the rails 110.

The rails 106 and 110 may be formed of a variety of materials. For example, the rails may be formed from composite materials, including, for example, fiberglass composite materials. In other embodiments, the rails 106 and 110 may be formed of a metal or metal alloy, including, for example, aluminum and aluminum alloys. The rails 106 and 110 may be formed using a variety of manufacturing techniques depending on various factors including the materials from which the rails are formed. For example, when formed as a composite member, rails may be formed using pultrusion or other appropriate processes associated with composite manufacturing. In one embodiment, the rails 106 and 110 may be formed generally as C-channel members exhibiting a substantially "C-shaped" cross-sectional geometry (such as may be seen best in FIG. 4).

The rungs 108 and 112 may also be formed from a variety of materials using a variety of manufacturing techniques. For example, in one embodiment, the rungs 108 and 112 may be formed from an aluminum material through an extrusion process. However, such an example is not to be viewed as being limiting and numerous other materials and methods may be utilized as will be appreciated by those of ordinary skill in the art. In one embodiment the rungs 108 and 112 may include a flange member (also referred to as a rung plate) for coupling to associated rails 106 and 110. For example, the flanges may be riveted or otherwise coupled with their associated rails 106 and 110. Some non-limiting examples of rungs and flanges according to certain embodiments are described in U.S. Patent Application Publication No. 2016/0123079, published on May 5, 2016, the disclosure of which is incorporated by reference herein in its entirety.

One or more mechanisms, often referred to as a rung lock 114, may be associated with the first and second assemblies 102 and 104 to enable selective positioning of the fly section 102 relative to the base section 104. This enables the ladder 100 to assume a variety of lengths (or, rather, heights when the ladder is in an intended operating orientation) by sliding the fly section 102 relative to the base section 104 and locking the two assemblies in a desired position relative to one another. By selectively adjusting the two rail assemblies (i.e., fly section 102 and base section 104) relative to each other, a ladder can be extended in length to nearly double its height as compared to its collapsed or shortest state as will be appreciated by those of ordinary skill in the art. The rung lock 114 is cooperatively configured with the fly section 102 and the base section 104 such that when the fly section 102 is adjusted relative to the base section 104, the associated rungs 106 and 110 maintain a consistent spacing (e.g., 12 inches between rungs that are immediately adjacent, above or below, a given rung). Some no-limiting examples of rung locks according to certain embodiments are described in the previously incorporated U.S. Patent Publication No. 2016/0123079.

The ladder 100 may additionally include a number of other components such as bearing members 118, which may be positioned, for example, at or adjacent an end of a rail of either the fly section 102 or the base section (although they may be positioned at locations intermediate of rail ends as well), to help maintain the fly section 102 and base section 104 in their slidably coupled arrangement and also to maintain the unique spacing of the rails of each section 102 and 104 as further discussed below. In certain embodiments, these bearing members 118 may be configured to provide improved strength and rigidity to the ladder 100 while accommodating the slidable coupling of the fly section 102 with the base section 104 such as will be described in further detail below.

Additionally, the ladder 100 may include various support structures including, for example, the bracket 120 positioned between (and coupled to) the rails 110A and 110B at a location beneath the lowest-most rung 112 of the base section 104 and which may include bumpers or "bump stops" such as described in previously incorporated U.S. Patent Publication No. 2016/0123079.

As also described in previously incorporated U.S. Patent Publication No. 2016/0123079, the fly section 102 and the base section may be arranged (including the rails and rungs of each respective section) so as to provide a ladder with a low profile or a small overall thickness or depth from the front surface of the rails 106 of the fly section to the rear surface of the rails 110 of the base section 104. For example, in one embodiment, the back surface of the rails 106 of the fly section 102 may be at a position that is approximately half way between the front surface and the rear surface of the rails 110 of the base section 104.

In one embodiment, the overall depth of the ladder may be approximately 1.5 times the depth of the rails 106 of the fly section 102 or approximately 1.5 times the depth of the rails 110 of the base section 104. A thinner profile provides numerous advantages, including, for example, savings in storage space, shipping volume and ease of transportation. In another embodiment, the overall depth of the ladder may be approximately 1.65 times the depth of 106 of the fly section 102 or approximately 1.65 times the depth of the rails 110 of the base section 104.

In one embodiment, in order to accommodate such an offset, the rungs 108 and 112 may also be offset relative to their associated rails 106 and 110. For example, the rungs 108 of the fly section 102 may be positioned closer the rear surface of their associated rails 106 than the front surface of the rails 106. Stated another way, the rungs 108 of the fly section 102 are offset, relative to a centered longitudinal axis of the rails 106, in a direction towards the rear surface of the rails 106. Similarly, the rungs 112 of the base section 102 may be offset towards the rear surface of their associated rails 110, relative to a centered longitudinal axis. As such, the rungs 112 are positioned closer to the rear surface than the front surface of the rails 110.

The rungs 108 and 112 may exhibit various geometries. For example, in one embodiment, the rungs 108 and 112 may exhibit a generally inverted triangular cross-sectional geometry having a substantially flat upper surface for the tread with angular surfaces extending downward from the tread. The transition between the two angular surfaces may be substantially rounded or arcuate as shown. More specifically, the cross-sectional geometry may include a generally flat upper surface that may include, for example, ridges, grooves, or other traction features. In some embodiments, the upper surface may not be truly flat, but may exhibit a slight arcuate convex shape along its outer surface.

Figure 2:
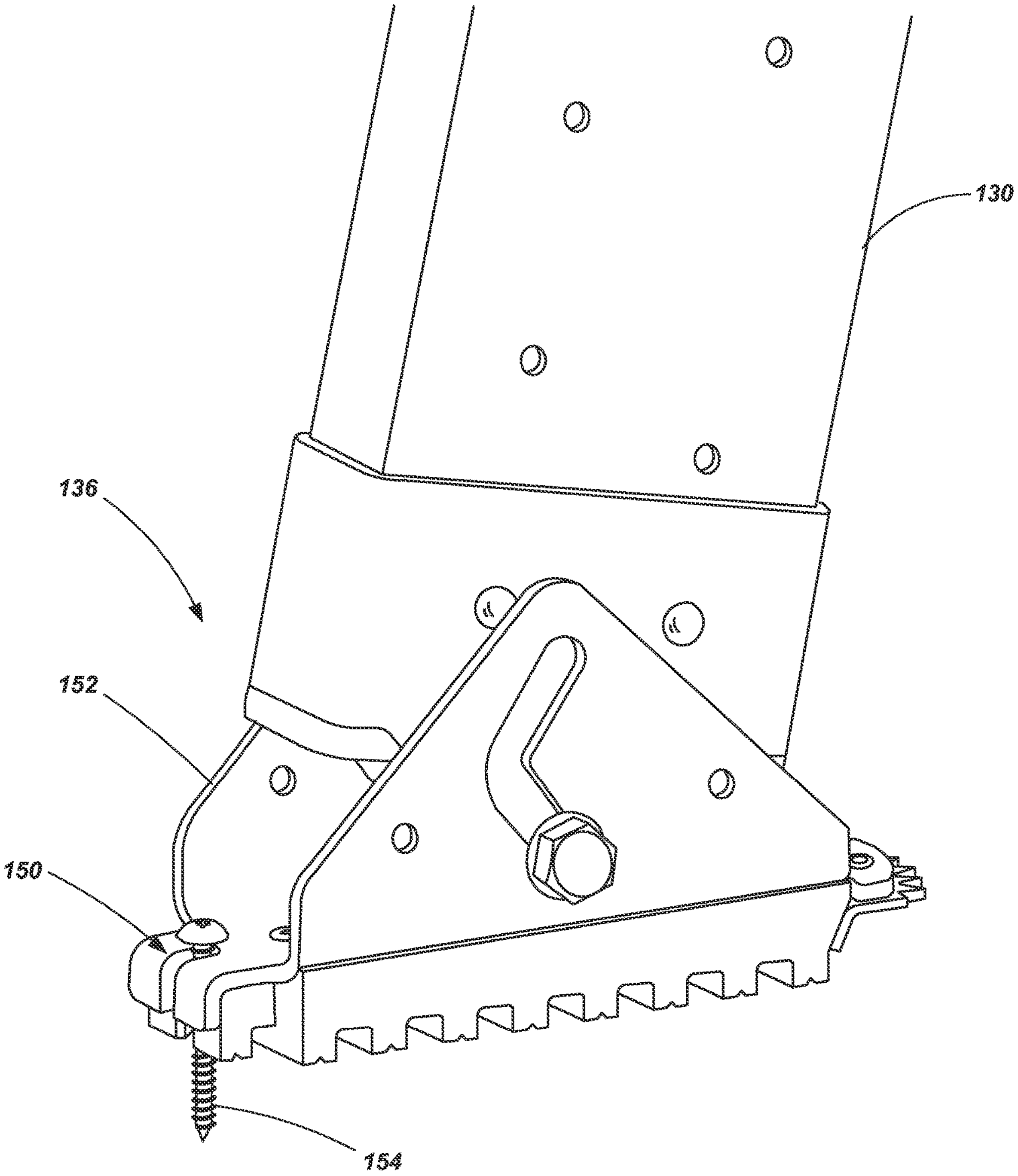
FIG. 2 is an enlarged perspective view of a foot of a ladder according to an embodiment of the present disclosure.

Such a rung geometry may reduce the depth of the tread (the distance across the top surface when looking at the cross-section, such as seen in FIG. 2), making it possible to shift or offset the rails 106 of the fly section 102 even further in one direction or the other. The geometry of the rungs may also provide certain advantages with regard to the ability of the rung to withstand deflection while also possibly reducing the amount of material required to form the rung, again reducing the weight of the overall ladder. Further, the shape of the rungs may more easily accommodate the use of the various rung locks described in further detail below.

Of course, other geometries are also contemplated for the rungs 108 and 112. For example, the rungs may be configured substantially as I-beams, as channel members or they may be configured more conventionally as round rungs, or D-rungs. Additionally, the rungs 108 of the fly section 102 need not exhibit the same geometry as the rungs 112 of the base section 104.

As will be discussed in further detail below, the ladder 100 also includes adjustable legs 130 positioned along the lower portion of the rails 110 of the base section 104. A swing-arm 132 is pivotally coupled to the base section 104 (e.g., by way of a bracket 134) and also pivotally coupled to a portion of the adjustable leg 130. A foot 136 may be coupled to the lower end of each leg 130 to support the ladder 100 on the ground or other surface. The foot 136 may be configured so that it may be selectively adapted for use on an interior surface (e.g., the floor of a building), or on a surface such as the ground. For example, the foot 136 may be pivotal relative to the leg 130 so as to have different portions of the foot 136 engage the supporting surface as selected by the user.

The adjustable legs 130 are configured so that a first end is hingedly coupled with an adjustment mechanism 140 which is slidably coupled with the rails 110 of the base section 104. The adjustment mechanism 140, therefore, enables the upper end of the adjustable legs 130 to be selectively positioned along a portion of the length of its associated rail 110. When the upper portion of the adjustable leg 130 is displaced relative to its associated rail 110, the lower portion of the leg 130, including its foot 136, swings laterally inward or outward due to the arrangement of the swing-arm 132 coupled between the leg 130 and the rail 110. Further details of the adjustable legs 130 and the adjustment mechanism 140 are described hereinbelow.

Other examples of adjustable legs and associated components (e.g., adjustment mechanisms) are described in U.S. Pat. No. 8,365,865, issued Feb. 5, 2013, to Moss et al., U.S. Pat. No. 9,145,733 issued Sep. 29, 2015, Worthington et al., and U.S. Patent Application Publication No 2015/0068842, published on Mar. 12, 2015, the disclosures of which are incorporated by reference herein in the their entireties.

Figure 3:
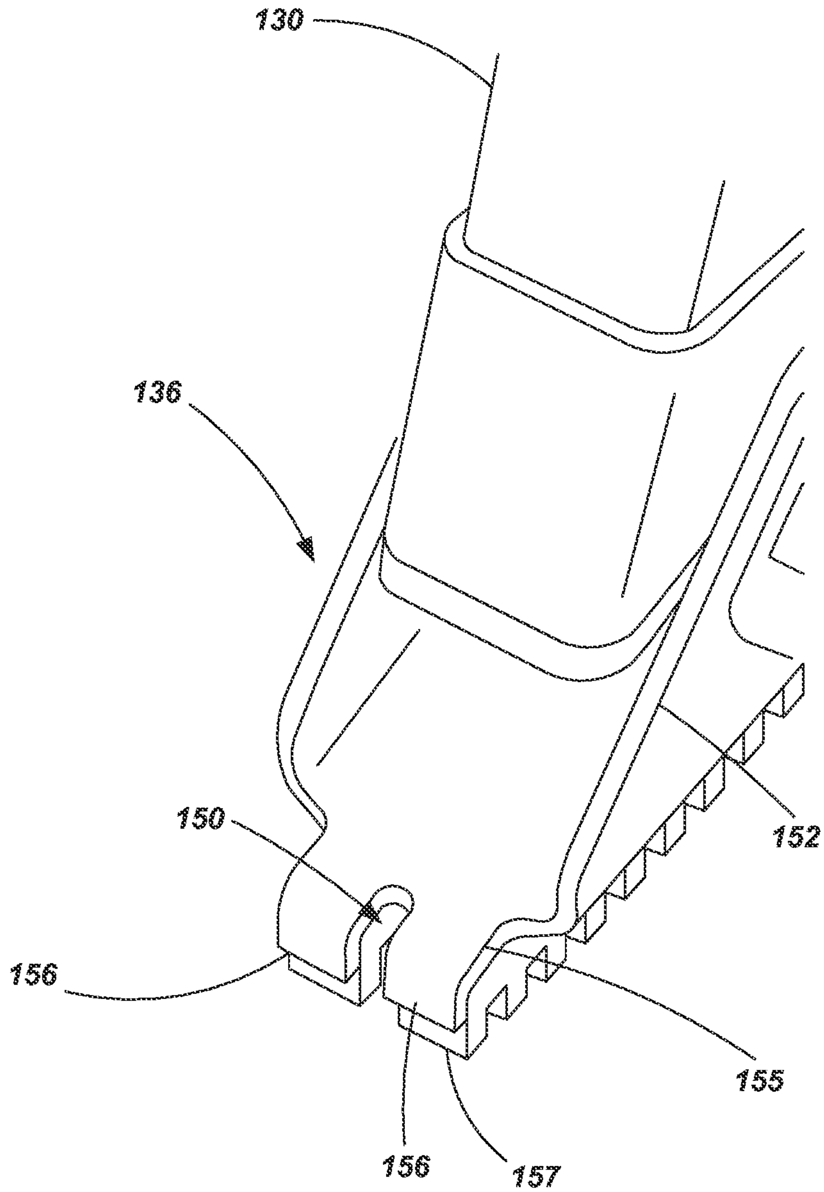
FIG. 3 is another perspective view of the foot shown in FIG. 2.

Referring to FIGS. 2 and 3, the ladder foot 136 may include a securing feature for securing the foot relative to a support surface as will be discussed in further detail below. For example, in one embodiment, the securing feature may include an open-faced notch or slot 150 formed in the front surface of a body portion 152 of the foot. The slot 150 may be sized and configured for receipt of a securing element 154 such as a screw, a nail, a bolt, a rod, a stake or some other retaining component. In one embodiment the body portion 152 may include a plate member 155 that is generally structurally rigid (e.g., comprising a metal or a metal alloy) having a periphery that includes the open-faced notch 150. In one particular embodiment, the plate may include a pair of fingers 156 that at least partially define the slot 150, the fingers each extending generally outward away from the front side of the ladder and also curving downwards, the slot extending in beyond the curved portions of the fingers 156. The foot 136 may also include a surface engaging portion, or a pad 157 disposed on a lower portion of the plate 155 and configured for engagement with one or more types of supporting surfaces (e.g., dirt, grass, wood or tile floors, etc.). In one embodiment, the pad 157 may be formed of an elastomer or polymer material (e.g., rubber) configured to provide traction (e.g., prevent slippage of the feet) without marring or damaging the supporting surface. In some embodiments, the pad 157 may include a patterned surface including a plurality of engagement portions to provide enhanced traction. In one embodiment, as shown in FIG. 3, the slot 150 may extend into a portion of the pad 157.

Considering the open-face slot 150, a user of the ladder may position the ladder 100 relative to a structure that is to be accessed via the ladder 100 and then place a screw, nail or other securing element through the slot 150 into the ground surface. For example, a user may place a nail or screw into a sub-floor of a newly constructed home or other structure. In another example, a user may drive a stake or spike into the ground. Because the slot is open-faced (e.g., not a closed curve), the user may remove the ladder 100 from the screw, nail or other securing element by sliding the feet 136 of the ladder 100 forward and away from the securing element—the securing element remaining in place in the support surface. If desired, the user may leave the securing element in the support surface (e.g., while working briefly at another adjacent location), and then return the ladder to its position to be secured again by the securing elements by sliding the open-faced slot 150 back into engagement with the securing element (e.g., nail or screw).

In some embodiments, another open-face slot may be positioned on the back side of the body portion of the foot if desired. However, if using two slots and two securing elements, one of the securing elements may have to be removed from the support surface prior to moving the ladder from a secured position. Other details of potential foot members are described in the previously incorporated documents.

Referring now to FIGS. 4 and 5A-5E, bearing members 118 configured as end caps are shown and described. The bearing members 118 are sized, shaped and configured to have a substantial portion of their bodies fit within the cavity formed by an associated rail (e.g., rails 110 of base section 104 shown—but also applicable to rails 106 of fly section 102). The bearing members 118 may be coupled to a given rail and configured to maintain a "front-to-back" lateral spacing between, and enable sliding displacement of, the fly section 102 relative to the base section 104 (the lateral spacing in this context being in a direction that is substantially perpendicular to the longitudinal axes of the rails themselves and extending from the front of the ladder towards the back of the ladder).

Considering a bearing member 118 disposed in a channel 400 of the rail 110 of the base section 104, the first bearing member 118 may be configured to engage a lip member of the rail 106 of the fly section 102 (e.g., such as described in previously incorporated U.S. Patent Application Publication No. 2016/0123079). Additionally, portions of the bearing member 118 may engage additional surfaces of the rail 106 of the fly section 102. For example, portions of the bearing member (e.g., portions of the L-slot 162, discussed below) may engage an internal flange surface and/or an internal web surface of the rail 106 of the fly section 102. During relative movement of the fly section 102 and the base section 104, the bearing member 118 remains coupled to the upper end of the rail 110 of the base section 104 while slidingly engaging the rail 106 of the fly section 102 (i.e., while the rail 106 slides relative to the bearing member 118 in a direction substantially parallel to the longitudinal axes of the rails). If coupled with lower end of the rail 106 of the fly section 102, the bearing functions similarly with respect to sliding engagement and support of the base section 104 . . . .

In one particular embodiment, the bearing member 118 may include various design features to accommodate the sliding coupling of the fly and base sections, while also providing necessary strength and rigidity to the ladder, such as when the fly section 102 is extended relative to the base section 104. For example, referring more specifically to FIGS. 5A-5E, in one embodiment, the bearing member 118 may be formed of a plastic material having a metal plate 160 (e.g., aluminum, titanium, steel, etc.) or other structural reinforcing member molded into or otherwise disposed on or within the body of the bearing member. In one embodiment, the metal plate 160 may extend substantially across the depth "D" of the bearing member 118 providing enhanced strength and rigidity. Further, the bearing member 118 may include what is referred to herein as an elongated L-slot 162 which may be best seen in profile in FIGS. 5B and 5D. The elongated L-slot 162 is shaped to receive a portion of a rail (e.g., it receives a portion of a rail 106 of the fly section when the bearing member 118 is inserted into a rail 110 of the base member 104). The L-slot 162 includes a lateral shoulder 164 or support surface configured to engage the front or rear flange surface of a rail (depending on whether it is installed in the fly section 102 or base section 104). The shoulder 164 or support surface is not merely a planar surface, nor is it always wholly conformal with a mating section of rail. Rather, the surface of the shoulder 164 is laterally angled and includes a longitudinal arcuate surface.

Figure 4:
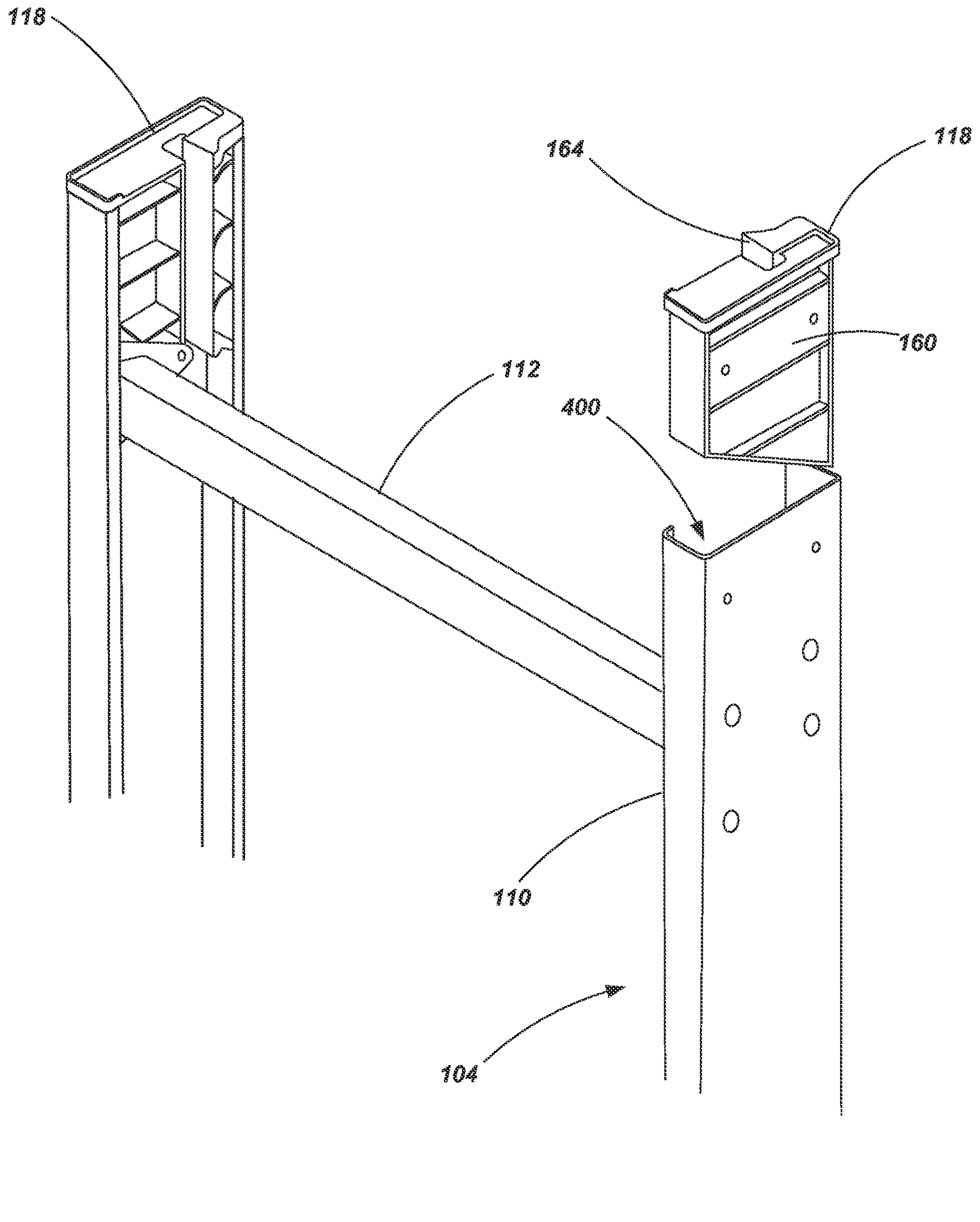
FIG. 4 a partially exploded view of a portion of the ladder shown in FIG. 1.
Figure 5C:
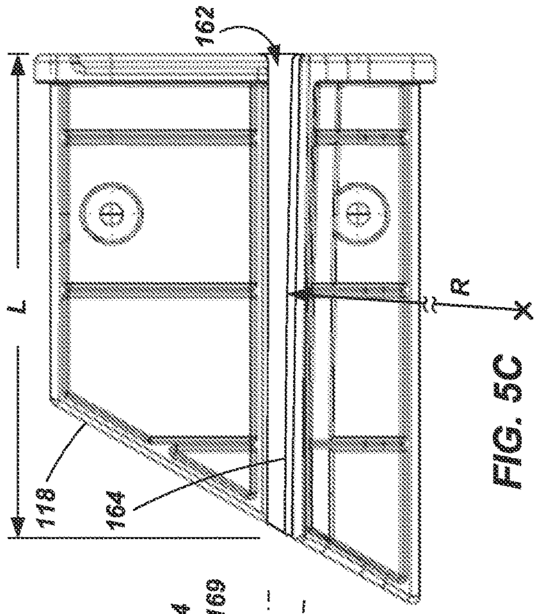
FIGS. 5A-5E depict various views of a ladder component shown in FIG. 4.
Figure 5B:
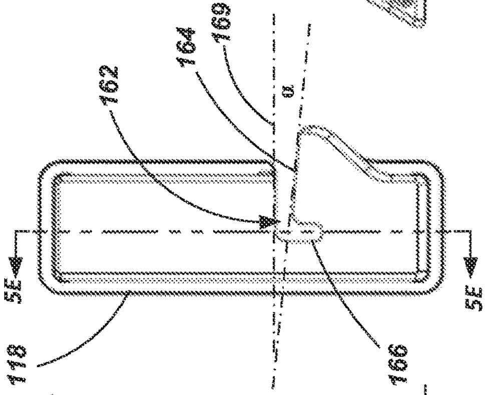
Figure 5A:
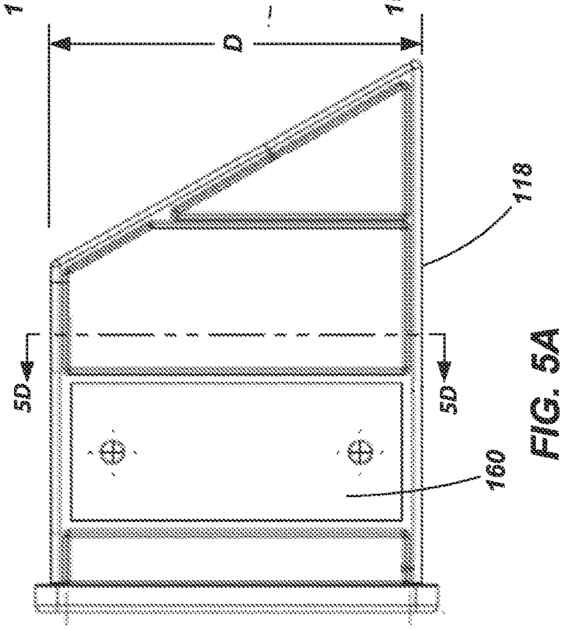
Figure 5E:
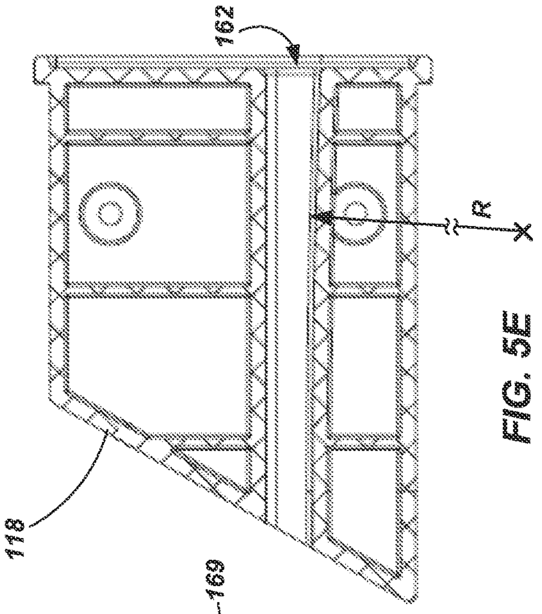
Figure 5D:
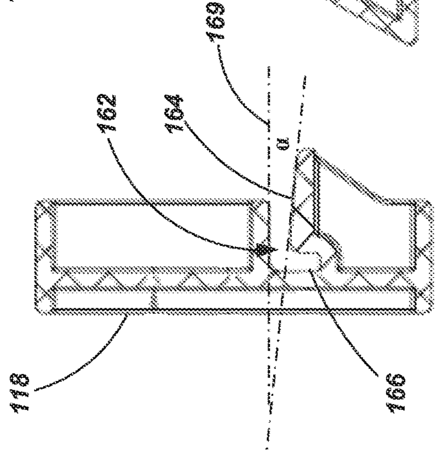

For example, referring to FIGS. 5B and 5D, the surface of the shoulder 164 is at an angle $\alpha$ relative to the lateral axis 169 (the axis 169 being generally parallel to the rungs). In one embodiment, this angle $\alpha$ may be approximately 4° to approximately 6°. In one specific embodiment, the angle may be approximately 5°. Additionally, as seen in FIG. 5C, the surface of the shoulder exhibits a slight radius R as it extends from one end of the bearing member 118 to the other. In one particular embodiment, the radius R may be 100 inches while the length L of the L-slot 162 may be approximately 3.75 to 4 inches. Stated another way, in one embodiment, the ratio of the radius R to the length of the shoulder may be approximately 25:1 or greater. In one embodiment, as seen in FIG. 5E, the leg section 166 of the L-slot 162 may exhibit a radius of curvature that is similar to the surface of the shoulder portion 164. Further, it is noted that the shoulder 164 may extend laterally inwardly considering its orientation relative to a rail section in which it is mounted (e.g., towards an opposing rail of the pair of rails) beyond any other portion of the bearing member 118 such as seen in FIGS. 4, 5B and 5D.

The angled and arcuate surface of the shoulder 164 enables the ladder 100 to experience some bending and twisting when the fly section 102 is extended-either partially or fully-relative to the base section 104 while maintaining a desired level of contact between the L-slot 162 and the engaged rail (e.g., the rail 106 of the fly section 102 when the bearing member 118 is installed in the end of a rail 110 of the base section 104 and vice versa). The bearing member 118, including the features such as described above enable the ladder 100 to maintain a desired level of strength and rigidity, anticipating the twisting and bending flexing of the ladder when in normal use. Additionally the use of bearing members, such as described above, enable a desired spacing of the rails 106 of the fly 102 section relative to the rails 110 of the base section 104 (e.g., the "offset" spacing as described above). Furthermore, the use of bearing members enable the fly section 102 to be slidably coupled with the base section without the need to use a conventional J-bracket as will be recognized by those of ordinary skill in the art.

Figure 6A:
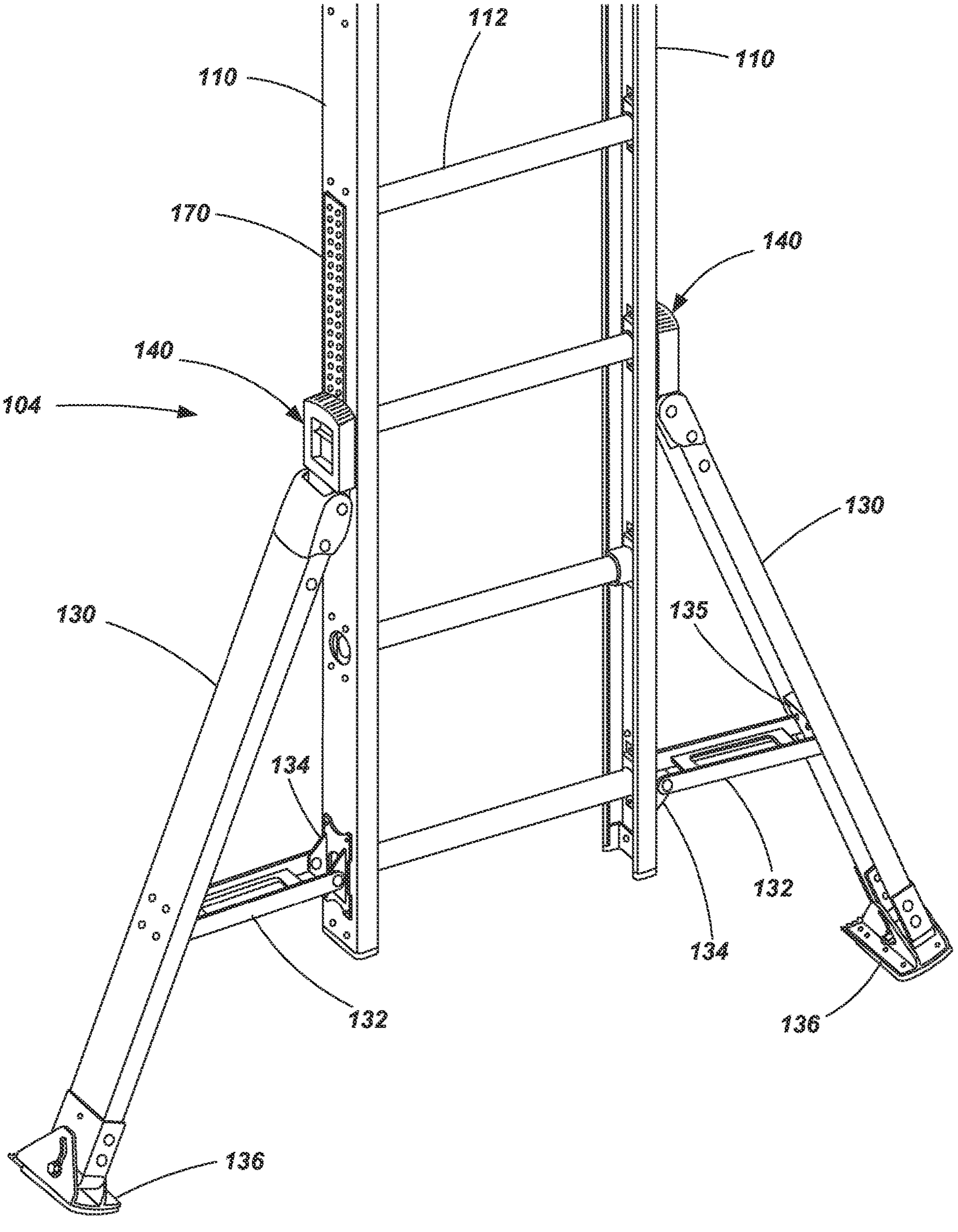
FIGS. 6A and 6B are perspective views of a lower portion of a ladder, such as the ladder shown in FIG. 1, with certain components shown in a first state in FIG. 6A and shown in second state in FIG. 6B.
Figure 6B:
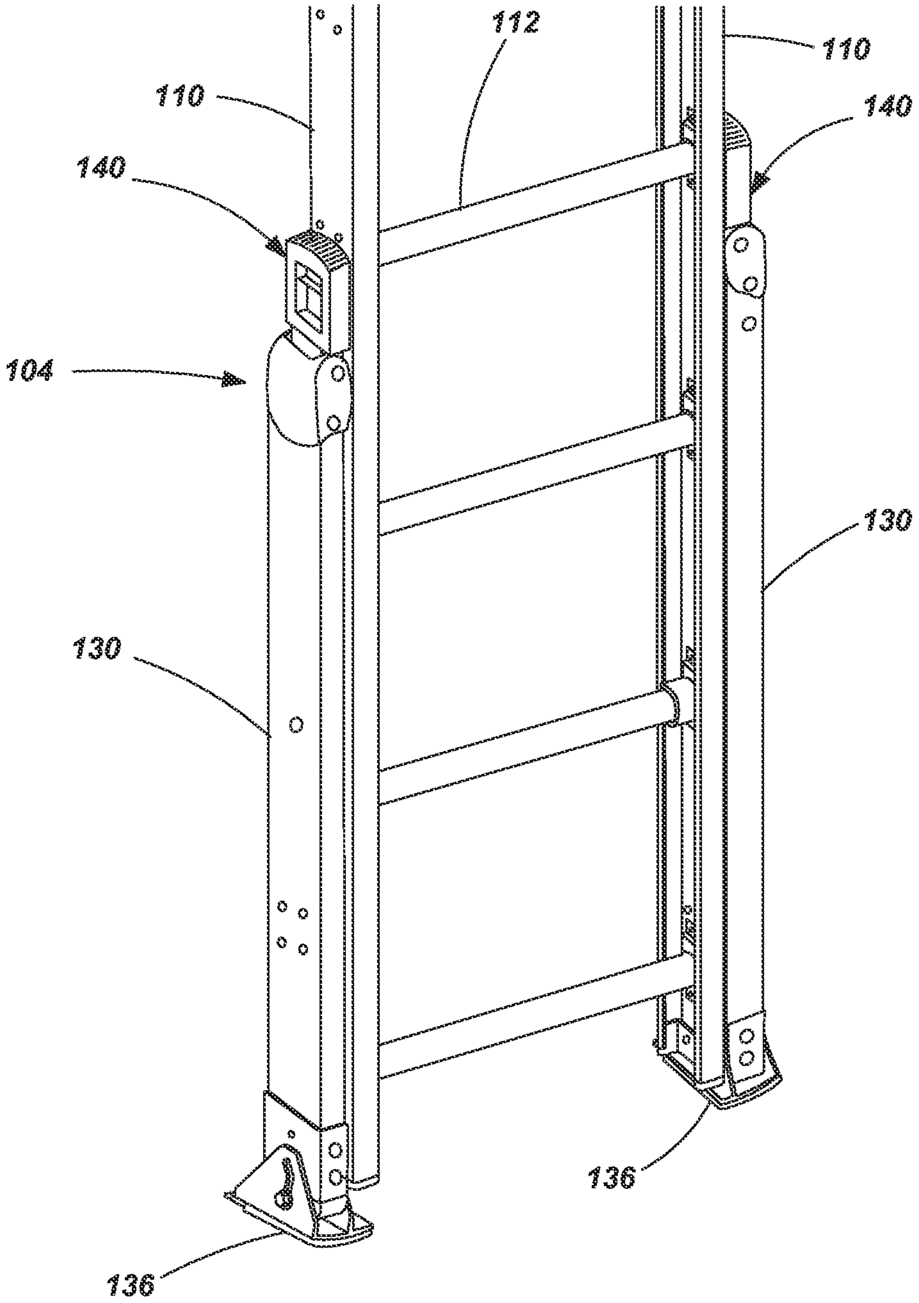

Referring briefly to FIGS. 6A and 6B, the adjustable legs 130 and associated components are shown in an open state (see FIG. 6A) and in a closed state (see FIG. 6B). As previously noted, the adjustable legs 130 have an upper portion hingedly coupled to an adjustment mechanism 140, and the adjustment mechanism 140 is slidably coupled to an associated rail 110 of the base section 104. A swing-arm 132 is pivotally coupled to a portion of the adjustable leg 130, such as by way of a bracket 135, and also pivotally coupled to a lower portion of an associated rail 110 of the base section 104, such as by way of another bracket 134. The adjustment mechanism 140 enables selective positioning of the upper end of the adjustable leg 130 relative to its associated rail 110. As the upper end of the leg 130 is displaced downward, toward the lower end of the rail 110, the lower end of the leg 130 (including the foot 136) is displaced laterally outward and away from its rail 110, as well as downward relative to its associated rail 110, such as shown in FIG. 6A. Each leg 130 is independently adjustable relative to its associated rail 110, enabling the legs 130 of the ladder to be adjusted to a variety of customized positions. Such selective positioning of the legs provides the ability to adjust for uneven terrain or support surfaces while also providing a wider and more stabilized base for the ladder, protecting against user over-reach and other safety hazards.

When the adjustable legs 130 are closed such as shown in FIG. 6B, the ladder is in a more compact state for transportation and storage. It is also noted that, when the ladder 100 is in the state shown in FIG. 6B, that the brackets 134 and 135, and the swing arms 132 are all substantially completely concealed within a cavity formed between legs 130 (which may exhibit a generally c-shaped profile) and the associated rail 110. This provides a ladder having a smaller profile while concealing various components from view and from exposure to being bumped or damaged during transportation and/or storage.

Figure 7:
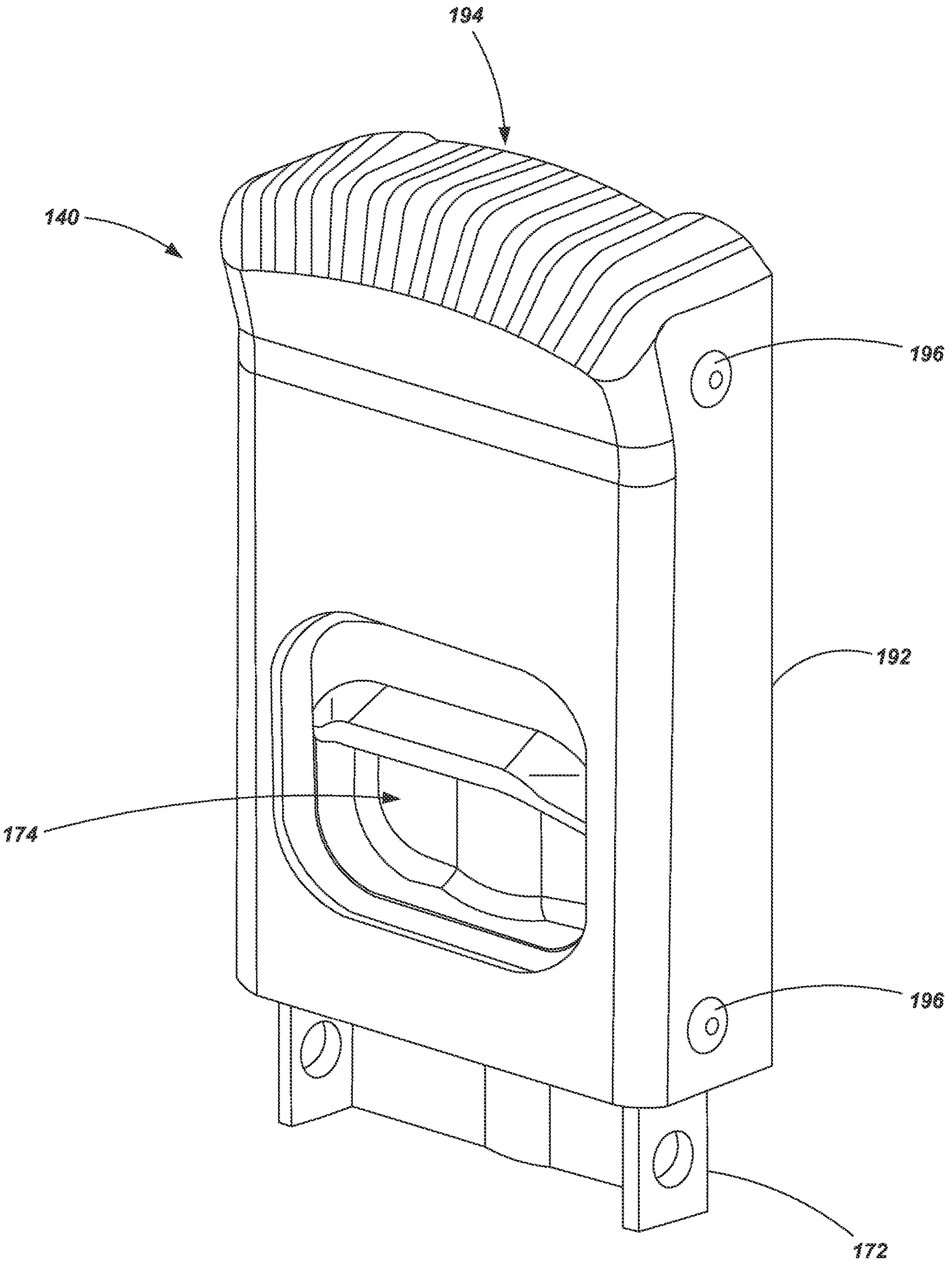
FIG. 7 is a perspective view of an actuating mechanism of the ladder shown in FIG. 1 according to an embodiment of the present disclosure.
Figure 8:
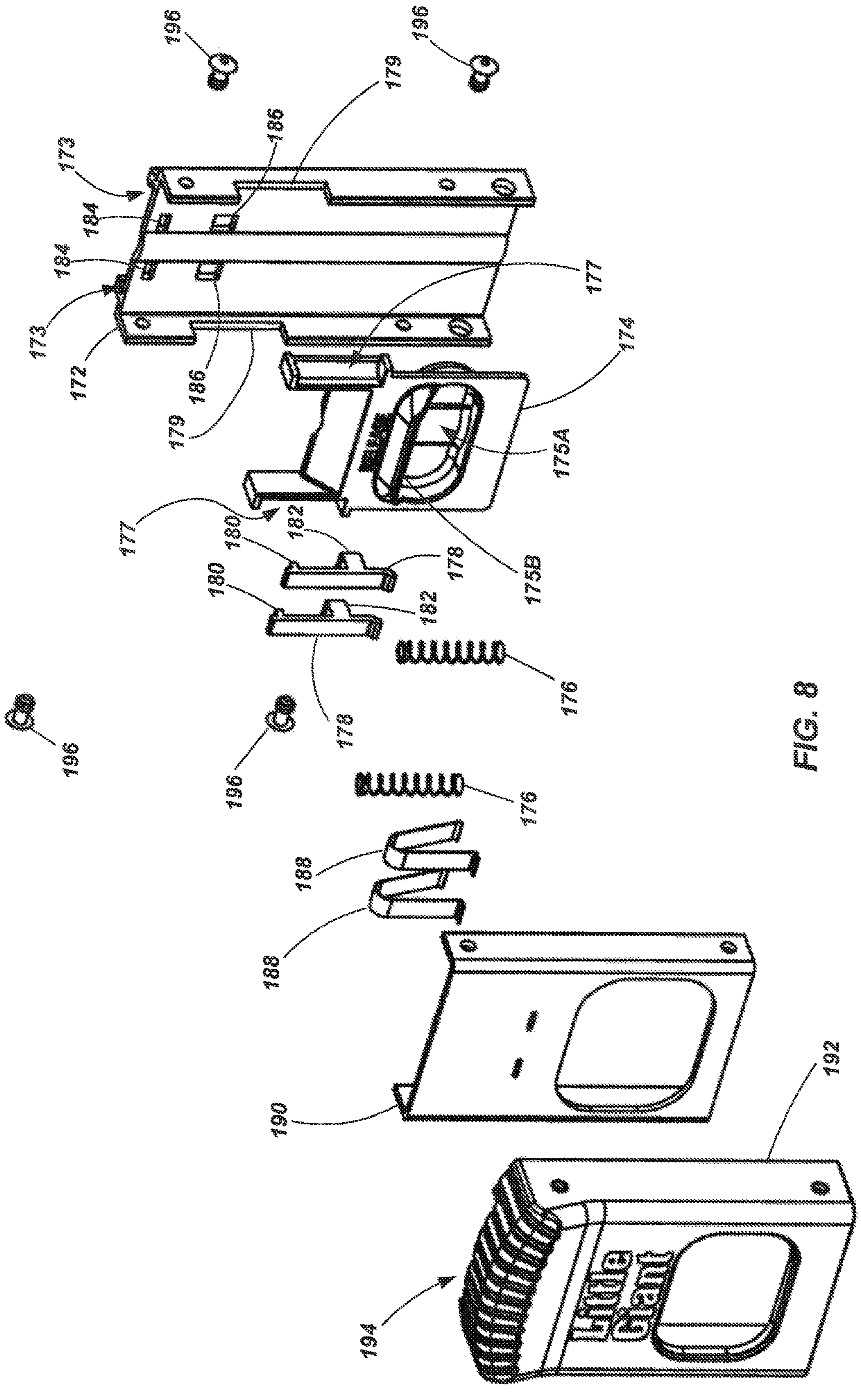
FIG. 8 is an exploded view perspective view of the mechanism shown in FIG. 7.

Referring now to FIGS. 7 and 8, one embodiment of the adjustment mechanism 140 is shown and described. It is noted that the adjustment mechanism 140 may be slidably coupled with a lock plate 170 (see, e.g., FIG. 6A) that is, in turn, fixed to an associated rail 110 of the base section 104. The adjustment mechanism 140 includes a slide plate 172 which may be slidably coupled with a lock plate 170 (e.g., by insertion of the lock plate within grooves 173 formed in the slide plate) and hingedly coupled with a leg 130. A release handle 174 is coupled with the slide plate 172 and is configured for sliding displacement relative to the slide plate 172. The release handle 174 may include a recess portion 175A and/or a shoulder portion 175B to enable a user to engage the release handle 174 with their hands and actuate it as will be described further below.

One or more springs 176 (e.g., coil springs or other biasing members) may be positioned between a portion of the release handle 174 and a portion of the slide plate 172 (and/or other associated components) to bias the release handle in a desired direction (e.g., downward in the orientation of the drawings). For example, the springs 176 may be partially positioned in cavities 177 formed within the release handle and partially disposed within cutout portions 179 of the slide plate 172 such that when the release handle 174 is displaced upward (in the orientation shown in the drawings) relative to the slide plate 172, the springs 176 become compressed between the two components and bias the release handle 174 back towards its original position.

One or more lock pins 178 include protrusions 180 and 182 that are configured to engage openings (e.g., openings 184 and 186, respectively) of the slide plate 172. The release handle 174 also engages with the lock pins 178 as will be discussed in further detail below. One or more lock springs 188 (e.g., u- or v-shaped spring clips or other biasing members) are positioned to maintain a biasing force between a front plate 190 and the lock pins 178, biasing the lock pins 178 towards engagement with the openings 184 and 186 of the slide plate 172. The front plate 190 also acts as a protective structure to protect the various components from impact during use of the ladder. A shroud 192 may cover the various components of the adjustment mechanism 140. The shroud 192 may include an upper surface 194 shaped, sized and configured for engagement by the palm of a user during actuation of the release mechanism as will be discussed below. The shroud 192, front plate 190 and slide plate 172 may be coupled together by way of fasteners 196, such as rivets, screws or other appropriate fasteners.

Referring to FIGS. 9A-9F, and with continued reference to FIGS. 7 and 8, operation of the adjustment mechanism 140 is shown and described. FIGS. 9A-9F show partial cross-sectional side views of the adjustment mechanism 140 coupled with a lock plate 170. For purposes of convenience and clarity, not all of the components of the adjustment mechanism 140 are shown (e.g., the springs 176), nor is the associated ladder rail 110 shown. Additionally, for clarity, only a single lock pin 178 and a single lock spring 188 are shown in FIGS. 9A-9F. In certain embodiments, the adjustment mechanism 140 may operate with a single lock pin 178 and lock spring 188, but in other embodiments, two or more lock pins 178 and associated lock springs 188 may be employed.

Figure 9A:
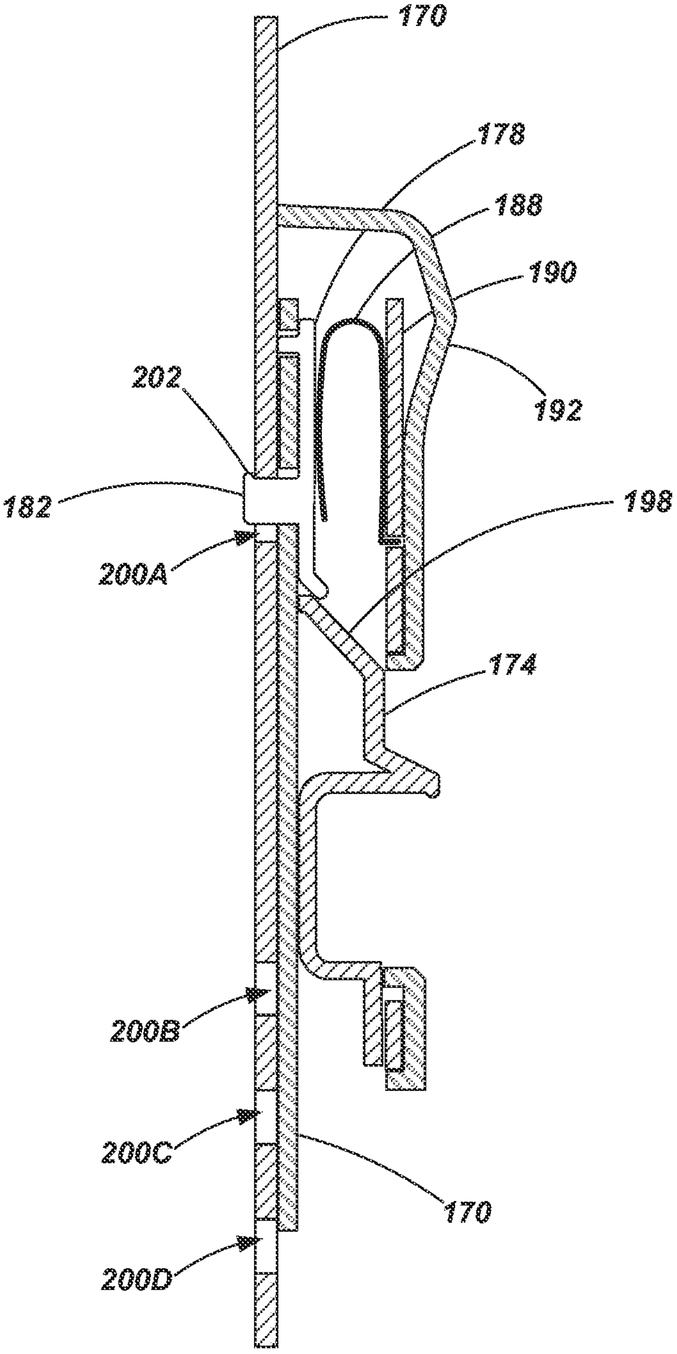
FIGS. 9A-9F are partial cross-sectional views of the mechanism shown in FIG. 7 while at various stages of adjustment or use.

As shown in FIG. 9A, the adjustment mechanism 140 is shown in a locked position which may be associated with the legs 130 being collapsed or closed such as shown in FIG. 6B. The locking protrusion 182 of the locking pin 178 of the extends through the opening 186 of the slide plate 172 and through an aligned opening 200 of the lock plate 170. It is noted that the lock spring 188 biases the locking pin 178 towards engagement with the openings 184, 186 of the slide plate 182 and opening 200A of the lock plate 170. When the ladder is resting on its feet 136 (see, e.g., FIGS. 1, 6A and 6B), a lip 202 on the protrusion 182 engages the upper portion opening 200A in the lock plate 170, preventing it from being retracted or displaced out of engagement with the opening 202 of the lock plate 170, even in the case that a user attempts to actuate the release handle 174. The lip 202 provides the same safety function when engaged with other openings (e.g., openings 200B, C and D) of the lock plate 170.

Figure 9B:
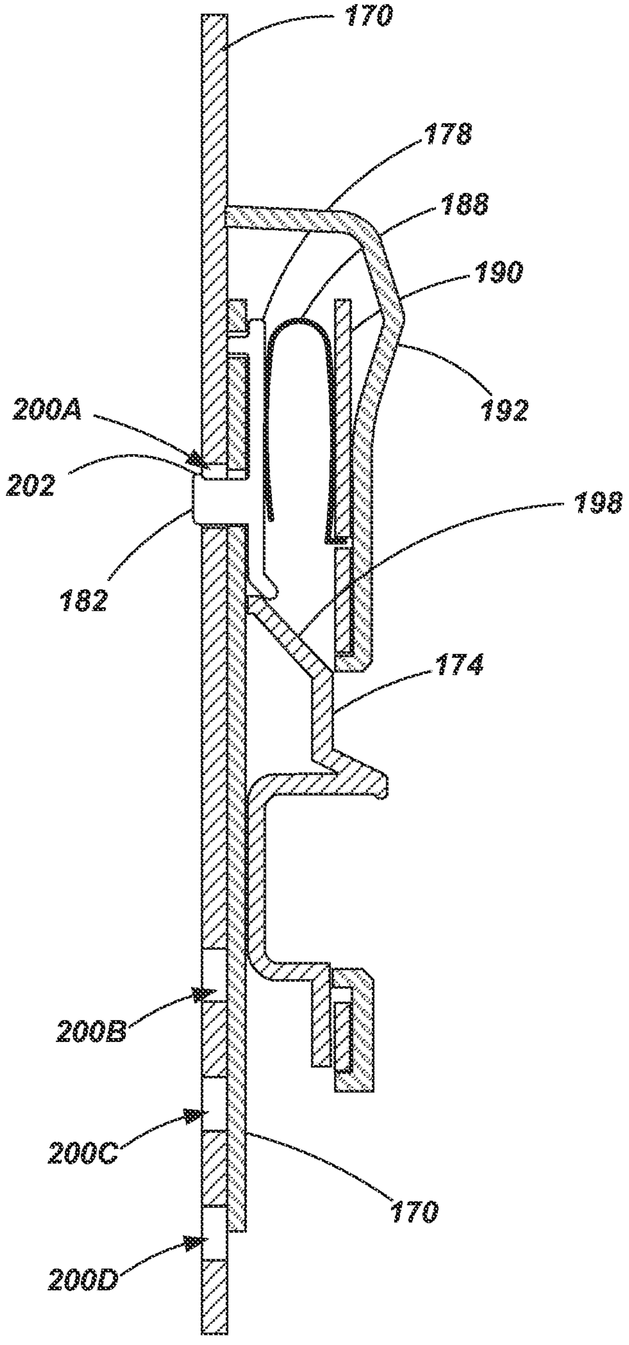

Referring to FIG. 9B, when the ladder 100 is lifted such that no upward force is exerted against the feet 136 or associated legs 130, the adjustment mechanism 140 is displaced slightly downward relative to the lock plate 170. When in this state, the upper surface of the locking protrusion 182, including the lip 202, is spaced from the upper surface of the opening 200A in the lock plate 170 a small distance to provide a desired amount of clearance between the lip 202 and the opening 200A.

Figure 9C:
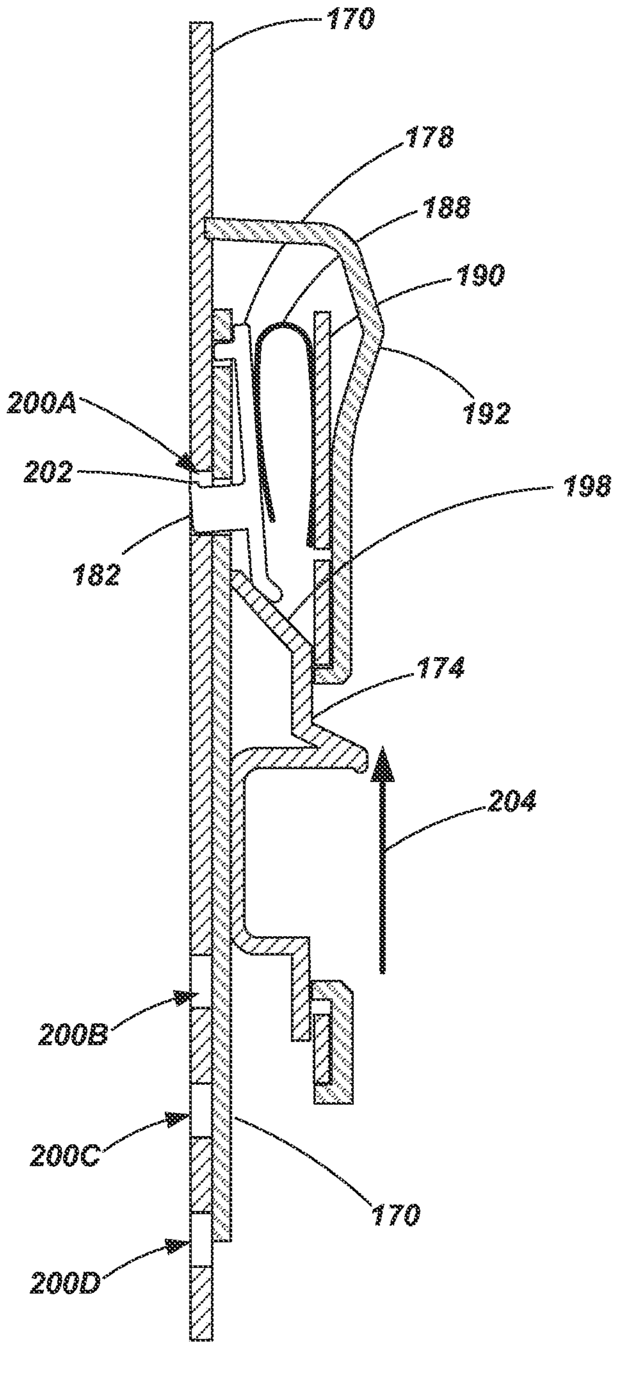

Referring to FIG. 9C, after adjustment mechanism 140 has been "unlocked" (or enabled for actuation by a user) by being displaced downward relative to the lock plate 170 (as shown in FIG. 9B), a user may then actuate the release handle 174 by, for example, placing their palm on the upper surface 194 of the shroud 192, grasping the lower surface of the shoulder 175B with their fingers and apply a squeezing action to displace the release handle 174 upwards as indicated by direction arrow 204. As the release handle 174 is displaced upward relative to the shroud 192, the front plate 190, the slide plate 172 and the lock pin 178, an upper inclined surface 198 of the release handle 174 slides between the lower portion of the lock pin 178 and the slide plate 172, causing the lower portion of the lock pin 178 to be displaced away from the slide plate 172 and the lock plate 170.

Figure 9D:
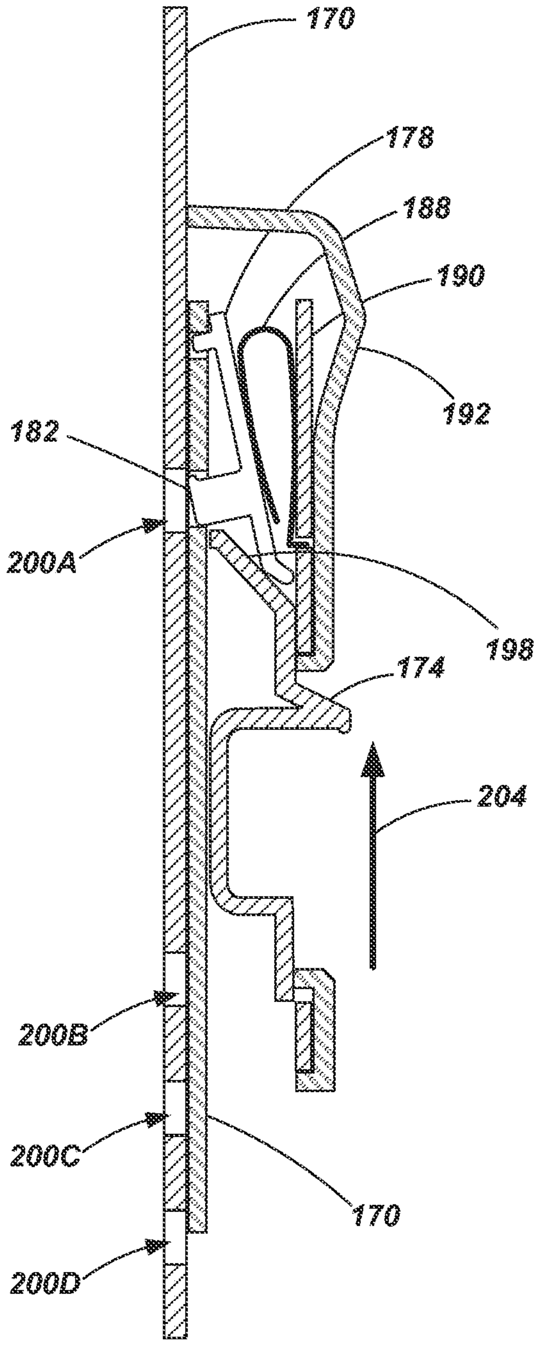
Figure 9E:
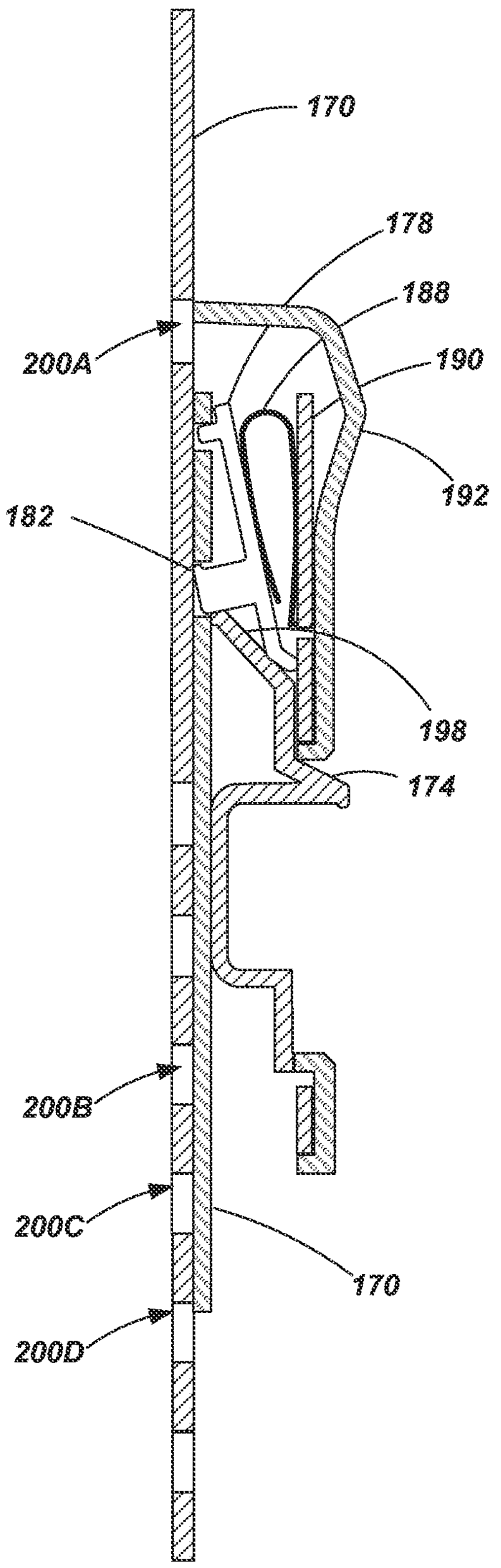
Figure 9F:
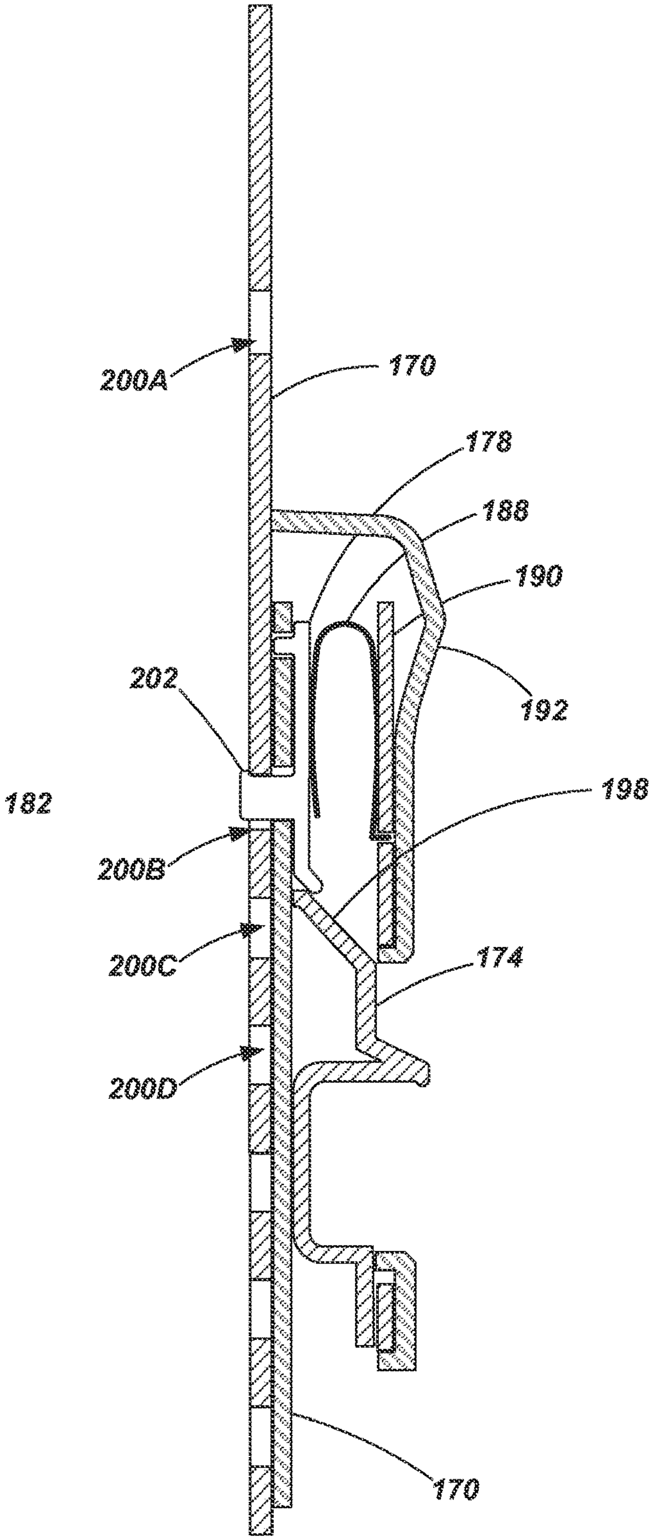

As shown in FIG. 9D, as the release handle is further displaced upward, as indicated by direction arrow 204, the upper inclined surface 198 of the release handle 174 acts as a ramp causing the lock pin 178 to further rotate until the locking protrusion 182 is completely displaced out of the opening 200A in the lock plate 170. With the locking protrusion 182 disengaged from the opening 200A, and with a firm grasp on the adjustment mechanism 140, the user may then displace the adjustment mechanism 140 along the lock plate 170 as desired. For example, as shown in FIG. 9E, the adjustment mechanism may be slid downwards relative to the lock plate 170 towards other openings (e.g., 200B, C, etc.). While sliding the adjustment mechanism 140 relative to the lock plate 170, the user may release the release handle 174, allowing it to be displaced downward relative to the shroud 192 and related components (e.g., by way of biasing force provided by springs 176), such that the locking protrusion 182 may engage another opening (e.g., 200B) upon alignment therewith due to the biasing force of the lock spring 188 as shown in FIG. 9F. This process may be repeated for continued adjustment of the leg members 130 as desired or as conditions may require.

It is noted that views shown in FIGS. 9A-9F only depict a single lock pin 178. In one embodiment, where dual lock pins 178 are used (such as shown in FIG. 8), two columns of openings (e.g., 200A-D and so forth) may be used (as depicted in FIGS. 1 and 6A). In one embodiment, the openings of each column may be aligned such that both lock pins 178 may be simultaneously engaged with associated openings in the lock plate 170. However, in another embodiments, the columns of openings in the lock plate 170 and the lock pins 178 may be arranged such that only a single lock pin 178 is engaged with an associated opening in the lock plate 170 at a given time. Such embodiments may provide finer intervals of adjustment for the leg 130 relative to the rail 110. For example, the columns of openings in the lock plate 170 may be staggered so that only one lock pin 178 is engaged with an associated opening at a time. In another embodiment, the columns of openings may be aligned, while the lock pins 178 are staggered. Similar arrangements of engagement members (e.g., locking protrusions 182) with openings (e.g., 202A-D) are described in the previously incorporated U.S. Patent Application Publication No. 2016/0123079.

While the embodiments of the disclosure may be susceptible to various modifications and alternative forms, specific embodiments have been shown by way of example in the drawings and have been described in detail herein. However, it should be understood that the disclosed embodiments are not intended to be limited to the particular forms disclosed. Indeed, features or elements of any disclosed embodiment may be combined with features or elements of any other disclosed embodiment without limitation. The invention includes all modifications, equivalents, and alternatives falling within the spirit and scope of the invention as defined by the following appended claims.

What is claimed is:

1. A ladder comprising:

a first assembly having a first pair of rails spaced apart from each other and a first plurality of rungs extending between, and coupled to, the first pair of rails;

a second assembly having a second pair of rails spaced apart from each other and a second plurality of rungs extending between, and coupled to, the second pair of rails, the first assembly being slidably coupled with the second assembly;

at least one bearing member coupled to a first rail of the first pair of rails, the at least one bearing member having a body portion disposed within a recess of the first rail and having an elongated L-slot formed within the body portion, the elongated L-slot matingly and slidingly engaging a first rail of the second pair of rails, wherein the elongated L-slot includes a lateral shoulder portion having a bearing surface angled relative to a lateral axis, the lateral axis extending through each of the first pair of rails substantially parallel to a longitudinal dimension of a rung of the first plurality of rungs, the bearing surface being configured to engage at least one of a front flange surface of the first rail of the second pair of rails or a rear flange surface of the first rail of the second pair of rails.

2. The ladder of claim 1, wherein the bearing surface has a radius of curvature about an axis substantially perpendicular to a longitudinal dimension of the elongated L-slot.

3. The ladder of claim 2, wherein the elongated L-slot includes a leg section having a radius of curvature about the axis substantially perpendicular to the longitudinal dimension of the elongated L-slot.

4. The ladder of claim 1, wherein the at least one bearing member is positioned at an end of the first rail of the first pair of rails.

5. The ladder of claim 1, wherein the elongated L-slot extends parallel to a longitudinal axis of the first rail of the first pair of rails.

6. The ladder of claim 1, wherein the lateral shoulder portion extends laterally inwardly relative to the first rail of the first pair of rails.

7. The ladder of claim 1, wherein the at least one bearing member comprises a metal reinforcement molded into or disposed on or within the body portion.

8. The ladder of claim 1, wherein the first rail of the second pair of rails includes a lip member, and the at least one bearing member engages the lip member.

9. The ladder of claim 1, wherein the at least one bearing member includes an arcuate support surface.

10. A ladder, comprising:

a base assembly having a first pair of rails and a first plurality of rungs extending between and coupled to the first pair of rails, at least one rail of the first pair of rails having a channel extending perpendicular to at least one rung of the first plurality of rungs and opening at an end of the at least one rung;

a fly assembly having a second pair of rails and a second plurality of rungs extending between and coupled to the second pair of rails;

a bearing member positioned in the end of the at least one rail and having a longitudinal slot receiving a second rail of the second pair of rails, the longitudinal slot having a radius of curvature along a longitudinal dimension of the longitudinal slot, wherein the radius of curvature is defined about an axis parallel to the first plurality of rungs.

11. The ladder of claim 10, wherein the longitudinal slot includes a lateral shoulder portion having a bearing surface angled relative to a lateral axis of the bearing member.

12. The ladder of claim 10, wherein the longitudinal slot is L-shaped.

13. The ladder of claim 10, wherein the longitudinal slot matingly and slidingly engages the second rail.

14. The ladder of claim 10, wherein the longitudinal slot is wider at a first longitudinal end of the bearing member than at a second longitudinal end of the bearing member.

15. A ladder comprising:

a first assembly having a first pair of rails spaced apart from each other and a first plurality of rungs extending between, and coupled to, the first pair of rails;

a second assembly having a second pair of rails spaced apart from each other and a second plurality of rungs extending between, and coupled to, the second pair of rails, the first assembly being slidably coupled with the second assembly;

at least one bearing member coupled to a first rail of the first pair of rails, the at least one bearing member having a body portion disposed within a recess of the first rail and having an elongated L-slot formed within the body portion, the elongated L-slot matingly and slidingly engaging a first rail of the second pair of rails, wherein the elongated L-slot includes a lateral shoulder protruding laterally inward toward a second rail of the first pair of rails beyond any other portion of the at least one bearing member.

16. The ladder of claim 15, wherein the elongated L-slot is wider at one longitudinal end of the at least one bearing member than at an opposite longitudinal end of the at least one bearing member.

17. The ladder of claim 15, wherein the lateral shoulder is angled relative to a lateral inward direction from the at least one bearing member.

18. The ladder of claim 15, wherein the lateral shoulder exhibits a radius of curvature relative to an axis perpendicular to a longitudinal axis of the first rail of the first pair of rails.

* * * * *